United States Patent [19]
Martinez

[11] Patent Number: 5,058,345
[45] Date of Patent: Oct. 22, 1991

[54] REINFORCED STRUCTURAL PANEL AND METHOD OF MAKING SAME

[76] Inventor: Manuel J. Martinez, Fernando Calder 483, Urb. Roosevelt Hato Rey, P.R. 00918

[21] Appl. No.: 554,274

[22] Filed: Jul. 17, 1990

[51] Int. Cl.[5] .......................... B23P 11/00; E04C 2/26
[52] U.S. Cl. ................................ 52/309.11; 52/309.12; 29/432
[58] Field of Search ......................... 52/309.12, 209.11; 264/46.7; 29/430, 432

[56] References Cited

U.S. PATENT DOCUMENTS

| | | | |
|---|---|---|---|
| 1,084,276 | 1/1914 | Jaminet | 52/586 |
| 3,305,991 | 2/1967 | Weismann . | |
| 3,383,817 | 5/1968 | Gregori | 52/309.12 |
| 3,879,908 | 4/1975 | Weismann . | |
| 4,104,842 | 8/1978 | Rockstead et al. . | |
| 4,226,067 | 10/1980 | Artzer . | |
| 4,253,288 | 3/1981 | Chun . | |
| 4,297,820 | 11/1981 | Artzer . | |
| 4,505,019 | 3/1985 | Deinzer . | |
| 4,611,450 | 9/1986 | Chen . | |
| 4,768,324 | 9/1988 | Hibbard . | |
| 4,785,602 | 11/1988 | Giurlani . | |

*Primary Examiner*—John E. Murtagh
*Attorney, Agent, or Firm*—Lerner, David, Littenberg Krumholz & Mentlik

[57] ABSTRACT

A reinforced structural panel having an integral, rigid core member of insulating material provided with a plurality of embedded serpentine or zig-zag shaped reinforcing rods is disclosed for fabricating walls of buildings and the like. The core member is provided with a plurality of slits on either major surface arranged in a matrix of rows and columns. The reinforcing rods are inserted into the core member along alternate rows from opposite surfaces of the core member. A wire mesh grid is positioned overlying the major surfaces and attached to the projecting portions of the reinforcing rods. A series of the resulting structural panels can be interconnected into a wall at the job site and thereafter covered with a layer of cementitious material.

35 Claims, 4 Drawing Sheets

REINFORCED STRUCTURAL PANEL AND METHOD OF MAKING SAME

BACKGROUND OF THE INVENTION

The present invention relates in general to building panels having thermal insulating properties, and more particularly, to composite reinforced structural panels designed for use as rigid, load-bearing structural walls and ceilings for commercial buildings, residential homes and the like.

New construction costs have been spiraling upward over the years as a result of higher material and labor costs. Of particular interest has been the utilization of less costly materials and the prefabrication of new construction components to reduce labor costs. To this end, light-weight synthetic materials including foam synthetic resins and expanded synthetic foams, such as polyurethanes and polystyrenes have found their place in the construction industry by virtue of their having a number of properties that are highly desirable in building materials for various types of structures such as walls, roofs and the like. These properties include lightweight, exceedingly low thermal conductivity, resistance to abrasion, impermeability to moisture and acoustic insulation. However, such materials generally are deficient in structural strength and must therefore be combined in some manner with other materials having satisfactory structural properties.

For example, structural panels are known which include a thermal insulating core disposed within a wire mesh framework. A number of techniques have been utilized in the construction of these panels. Rockstead et al., U.S. Pat. No. 4,104,842 and Weismann, U.S. Pat. No. 3,305,991 disclose the filling of the interior of a prefabricated wire mesh framework with liquid foam components which harden to form the rigid insulating core. However, considerable difficulty has been experienced in maintaining the requisite components of the wire mesh framework in their appropriate orientation during fabrication and/or during application of the liquid foam components so that when the foam has solidified, an integral unit can be provided.

Chun, U.S. Pat. No. 4,253,288 initially assembles the wire mesh framework using a plurality of forms which are removed prior to filling the interior of the framework by blowing liquid insulating foam material into the framework. As one would appreciate, the necessity of using these forms and constraining devices to hold the framework components in their proper orientation during fabrication is undesirable.

Weismann, U.S. Pat. No. 3,879,908 avoids some of the aforementioned problems of the foam-in-place core by, instead, constructing the wire mesh framework and inserting a plurality of insulating core elements through passages that are provided within the framework. These insulating core elements must be dimensioned so as to be freely and easily passed between adjacent components of the framework which results in permeability of the resulting panel to moisture, as well as lacking an integral panel construction. To this end, there is applied a layer of a bonding agent to bond the insulating core elements to the components of the wire mesh framework and, to some degree, to provide a moisture barrier.

One solution to avoiding the separation inherent in the above panel construction technique is known from Chen, U.S. Pat. No. 4,611,450, Hibbard, U.S. Pat. No. 4,768,324 and Artzer, U.S. Pat. Nos. 4,297,820 and 4,226,067. This construction technique interdigitates the insulating core elements with the components of the wire mesh framework during the fabrication process. However, once again the incorporation of individual insulating core elements precludes the formation of an integral structural panel, as well as reducing its mechanical strength.

The fabrication of structural panels including an integral, rigid insulating core are known from Giurlani, U.S. Pat. No. 4,785,602 and Deinzer, U.S. Pat. No. 4,505,019. In Giurlani, a one-piece insulating core member is disposed between a pair of wire meshes having cross tie rod-like members pushed transversely through the insulating core member and secured to the wire mesh. In Deinzer, a similar structural panel is disclosed with the cross tie rod-like members being angularly disposed within the insulating core member.

Despite the advantages of the integral structural panels achieved by Giurlani and Deinzer, the use of cross tie rod-like members are undesirable. In this regard, each of the rod-like members are separate from one another and do not create a unified reinforcement of the structural panel, in addition to requiring additional labor costs associated with the insertion of each rod-like member. To this end, Deinzer also discloses the use of serpentine shaped rod-like reinforcing members arranged in spaced apart relationship within the wire mesh framework. However, in order to accommodate these serpentine shaped rod-like members, it is necessary that Deinzer form the insulating core from liquid synthetic material which is cast within the wire mesh framework about the serpentine shaped rod-like members.

For a number of reasons, it has been found desirable to incorporate serpentine shaped rod-like members into the wire mesh frameworks of structural panels having insulating cores. Although a number of structural panels are known which incorporate these serpentine shaped rod-like members, the techniques disclosed for fabricating the structural panels have a number of disadvantages. For example, Chun requires the prefabrication of the wire mesh framework using forms interdigitated between the serpentine shaped rod-like members during fabrication. Similarly, Chen, Rockstead et al., and Weismann also require the prefabrication of the wire mesh framework. Once fabricated, the insulating core is formed from a liquid synthetic material using molds and spray application. A similar molding process is disclosed in Deinzer as noted. In Artzer, the structural panel requires the use of strips of insulating core elements separately interdigitated between the serpentine shaped rod-like members.

In the fabrication of these structural panels, it is desirable to provide the insulating core as an integral, rigid one-piece member integrated with the serpentine shaped rod-like reinforcing members in that it provides greater structural integrity to the panel as well as maintaining the dimensions and space relationships of the components forming the wire mesh framework. There is heretofore unknown a fabrication technique for these structural panels which employ an integral, rigid one-piece insulating core and a plurality of interdigitated serpentine shaped rod-like members as noted hereinabove.

SUMMARY OF THE INVENTION

In accordance with one embodiment of the present invention, there is disclosed a method of making a reinforced structural member including providing a panel of synthetic material having two opposing major surfaces, piercing both of the major surfaces to provide a plurality of slits extending through the panel, inserting serpentine shaped members into the slits, a portion of the members extending outwardly from each of the major surfaces, superimposing a grid on each of the major surfaces, and securing the portions of the members to the grid on each of the major surfaces.

In accordance with another embodiment of the present invention, there is disclosed a method of making a reinforced structural member including providing an integral panel of thermal insulating material having two opposing major surfaces, piercing each of the major surfaces to provide a plurality of slits extending through the panel arranged in a matrix of rows and columns, the slits in adjacent rows longitudinally offset from one another, inserting serpentine shaped first members into the slits forming alternate rows of the matrix on one of the major surfaces, a portion of the first members extending outwardly from each of the major surfaces, inserting serpentine shaped second members into the slits forming alternate rows of the matrix on another of the major surfaces, a portion of the second members extending outwardly from each of the major surfaces, superimposing a grid on each of the major surfaces, and securing the portion of the first and second members to the grid on each of the major surfaces.

In accordance with another embodiment of the present invention, there is disclosed a reinforced structural member constructed of an integral panel of synthetic material having two opposing major surfaces, a plurality of slits extending through the panel formed by piercing both of the major surfaces, a plurality of serpentine shaped members received within the slits, a portion of the members extending outwardly from each of the major surfaces, a grid superimposed on each of the major surfaces and the portions of the members secured to the grid on each of the major surfaces.

In accordance with another embodiment of the present invention there is disclosed a reinforced structural member constructed of an integral panel of thermal insulating material having two opposing major surfaces, a plurality of slits extending through the panel arranged in a matrix of rows and columns formed by piercing each of the major surfaces, the slits in adjacent rows longitudinally offset from one another, serpentine shaped first members received within the slits forming alternate rows of the matrix on one of the major surfaces, a portion of the first members extending outwardly from each of the major surfaces, serpentine shaped second members received within the slits forming alternate rows of the matrix on another of the major surfaces, a portion of the second members extending outwardly from each of the major surfaces, a grid superimposed on each of the major surfaces and the portions of the first and second members secured to the grid on each of the major surfaces.

BRIEF DESCRIPTION OF THE DRAWINGS

The above description, as well as further objects, features and advantages of the present invention will be more fully understood with reference to the following detailed description of a reinforced structural panel and method of making same, when taken in conjunction accompanying drawings, wherein.

DETAILED DESCRIPTION

Figure 1:
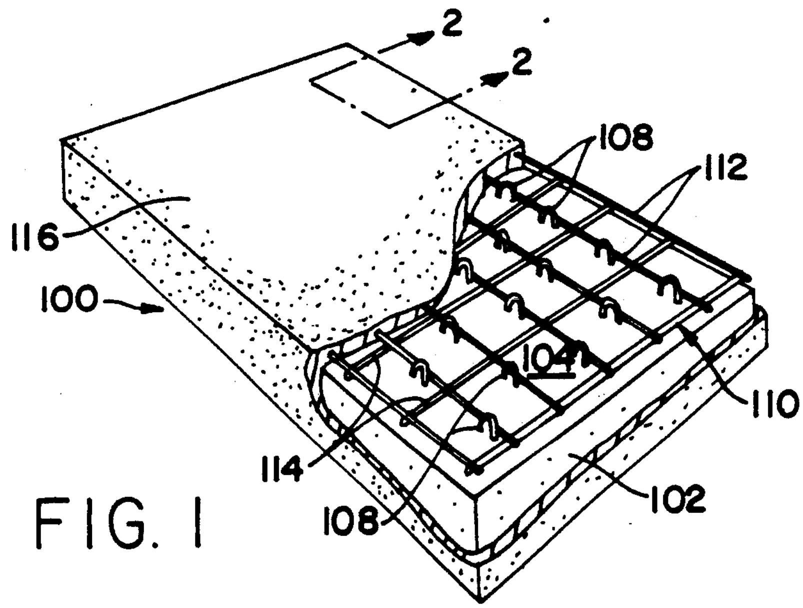
FIG. 1 perspective view of a reinforced structural panel fabricated in accordance with the present invention and having a portion thereof removed to illustrate the interior construction and component parts.

Referring now to the drawings, wherein like reference numerals represent like elements, there is shown in FIG. 1 a perspective view of a composite reinforced structural panel designated generally by reference numeral 100. The panel 100 includes an integral, rigid one-piece thermal insulating core 102 having a generally rectangular shape provided with two opposing major surfaces 104, 106. The insulating core 102 is preferably provided in four foot widths, twelve and eight foot lengths, and a thickness of two inches. However, it is to be understood that the insulating core 102 may be provided in other dimensions and shapes as may be desired in the fabrication of a reinforced structural panel 100 in accordance with the present invention.

The insulating core 102 may be composed of any suitable insulating material which forms a relatively rigid, planar structure. The insulating material forming the core 102 should have a relatively low density, low thermal conductivity, a high compressive strength, and good fire resistance and retardation characteristics. A number of foam and cellular materials meet these requirements in varying degrees and are thus suitable for utilization in the practice of the present invention. Suitable types are foam or cellular epoxies which have found extensive use as core material in light sandwich structures for building doors, partitions and panels. Foam and cellular polystyrenes are inexpensive, easily processed at low temperatures and pressures, provide goods sound insulation and do not generate toxic fumes when burned. Foam or cellular silicon can also be used, but the compressive strength is not as high as some of the other types. Foam and cellular polyurethanes are also suitable for use as the insulating core 102. In general, the higher density foams form a more rigid structure while maintaining the low thermal conductivity property and are most preferred. In accordance with the preferred embodiment, the insulating core 102 is constructed from expanded polystyrene foam having a density of 1.0 PCF or polyurethane having a density of 1.0 PCF.

A plurality of serpentine or zig-zag shaped reinforcing rods 108 are embedded in spaced apart rows within the insulating core 102 as to be described hereinafter. A wire mesh grid 110 constructed from interconnected longitudinal rods 112 and transverse rods 114 is positioned overlying the two opposing major surfaces 104, 106 of the insulating core 102. As to be described hereinafter, the longitudinal rods 112 are secured to portions of the reinforcing rods 108 which extend outwardly of the two opposing major surfaces 104, 106 of the insulating core 102. The reinforcing rods 108, longitudinal rods 112 and transverse rods 114 are constructed from steel wire number 10 gauge conforming to ASTM A-82 and to ASTM A-185 as a welded steel wire fabric. In the construction industry, the building codes typically require that a number 12 gauge wire or smaller must be galvanized in order to protect it from corrosion. Number 10 gauge rods can therefor be used without galvanization which results in better adhesion to the cementitious material which is applied as to be described hereinafter. The longitudinal rods 112 and transverse rods 114 are welded to each other in a matrix of rows and columns having four inch centers to provide four inch by four inch rectangular spaces as shown.

The structural panel 100 as thus far fabricated is encased with a layer 116 of cementitious material. By way of example, the cementitious material may comprise a mixture of Portland cement complying with ASTM-C-150 and aggregates. The aggregates include natural plaster sand complying with ASTM C-144-62T and Gypsum plaster aggregates complying with ASTM C-35. The mixture of Portland cement and aggregates comply with Table No. 4F of the Uniform Building Code. The cementitious material should have a minimum 28-day compressive strength of 2,000 PSI or greater as required by design considerations.

Figure 4:
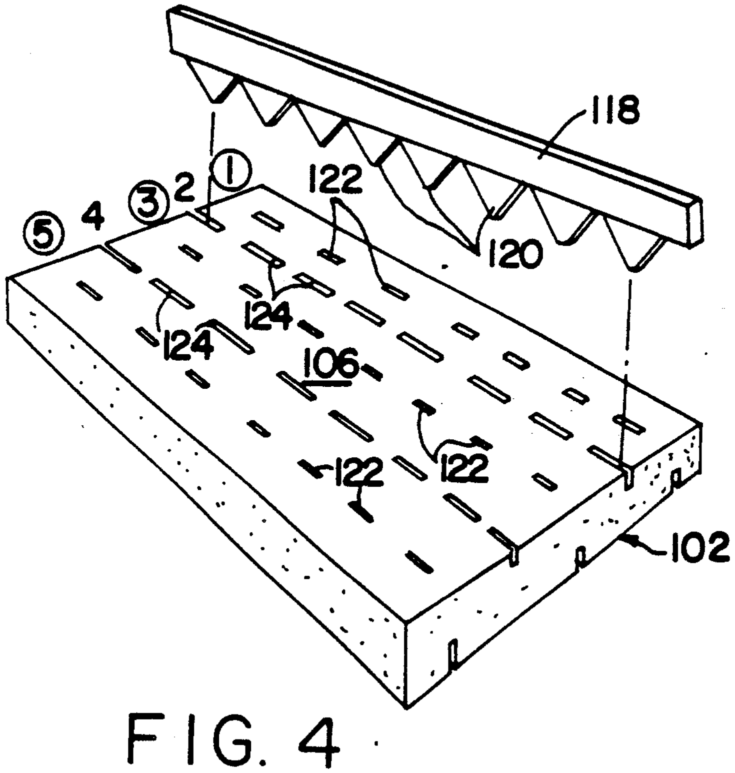

Referring now to FIGS. 2 thru 9, the method of fabricating the reinforced structural panels 100 of the present invention will now be described. Specifically referring to FIG. 3, there is provided a knife assembly 118 having a plurality of V-shaped blades 120 arranged in collinear alignment. The major surface 104 of the core 102 is delineated by a plurality of rows (a)–(e) arranged on four inch centers. The knife assembly 118 is pressed into the core 102 along alternate rows (a), (c) and (e) on the major surface 104. The depth of each blade 120 is greater than the thickness of the core 102 such that the tip of each blade penetrates the opposing major surface 106 of the core as shown in FIG. 4. As a result, the opposing major surfaces 104, 106 of the core 102 are provided with a plurality of slits 122 extending through the core and arranged in a matrix of rows and columns. Due to the V-shaped nature of the blades 120, the slits 122 on surface 104 are of greater length than the corresponding slits on the opposing surface 106.

As shown in FIG. 4, the core 102 is turned over to expose the major surface 106 to the knife assembly 118. In a similar manner, the knife assembly 118 is used to form a plurality of slits 124 along alternate rows (b) and (d) arranged in a matrix of rows and columns. In forming slits 124, the knife assembly 118 is displaced longitudinally one-half the width of the blades 120 such that the slits 124 are offset longitudinally with respect to slits 122 as to be discussed hereinafter with respect to FIG. 2.

Figure 5:
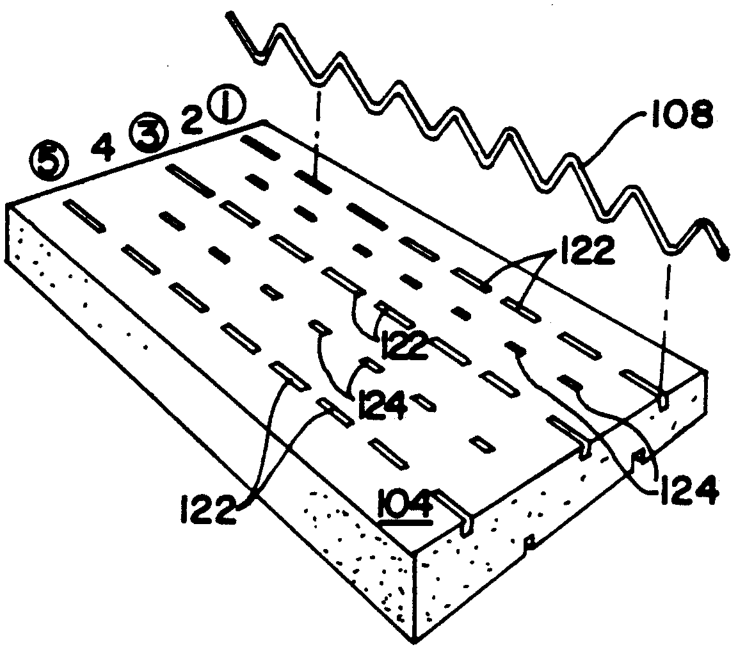
FIGS. 5 and 6 are perspective views of inserting serpentine shaped rod-like members into alternate rows of slits formed within the two opposing major surfaces of the insulating core member in accordance with the method of the present invention.
Figure 6:
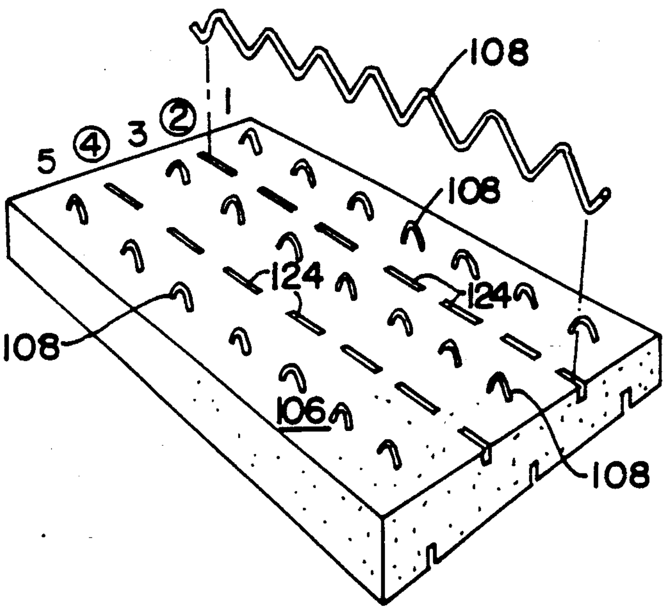

Turning now to FIG. 5, a plurality of serpentine or zig-zag shaped reinforcing rods 108 are inserted into the core 102 from major surface 104 through slits 122 arranged along alternate rows (a), (c) and (e). Similarly, as shown in FIG. 6, a plurality of serpentine or zig-zag shaped reinforcing rods 108 are inserted into the core 102 from major surface 106 through slits 124 along alternate rows (b) and (d).

Figure 2:
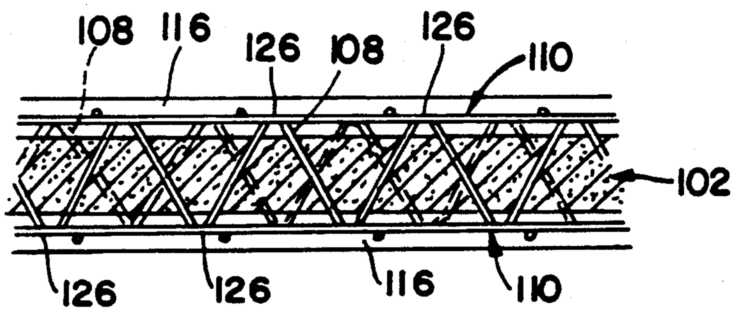
FIG. 2 is a cross-sectional view taken along lines 2—2 in FIG. 1.
Figure 3:
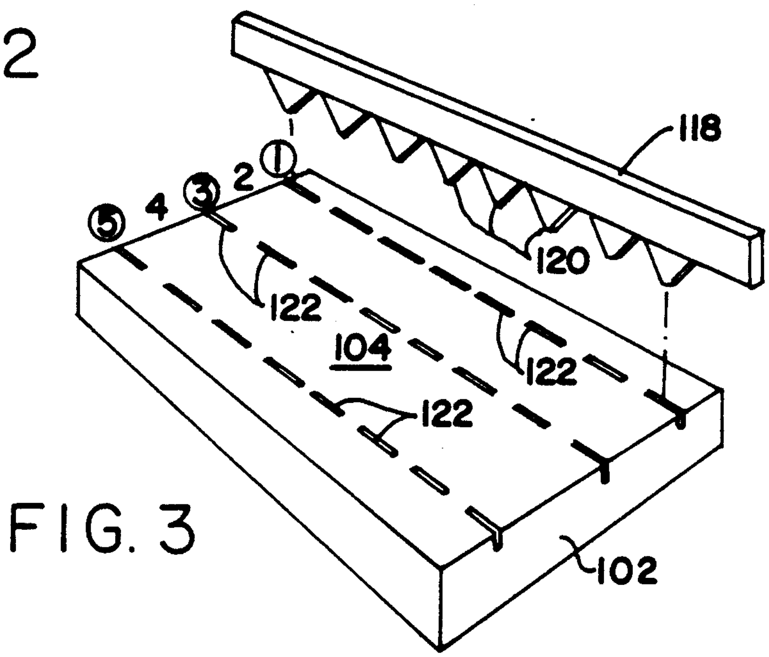
FIGS. 3 and 4 are perspective views showing the formation of slits arranged in a matrix of rows and columns within the opposing major surfaces of an integral core member of thermal insulating material in accordance with the method of the present invention.

As shown in FIG. 2, the serpentine or zig-zag shaped reinforcing rods 108 in adjacent rows are arranged in staggered relationship with one another by being longitudinally offset as clearly indicated by the reinforcing rod 108 indicated in dashed lines. The height dimension of the reinforcing rods 108 is greater than the thickness of the core 102 such that portions 126 extend outwardly beyond the major surfaces 104, 106 of the core. In accordance with one embodiment, the projecting portions 126 of the reinforcing rods 108 extend above the major surfaces 104, 106 of the core 102 approximately three quarters of an inch.

Figure 7:
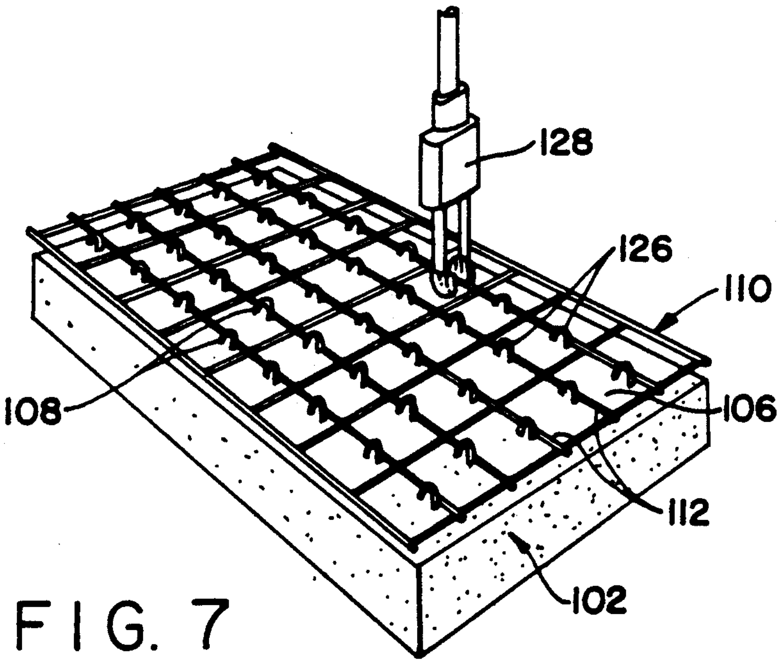
FIGS. 7 and 8 are perspective views of securing a wire mesh disposed over the two major surfaces of the insulating core member to portions of the serpentine shaped rod-like members projecting outwardly therefrom in accordance with the method of the present invention.
Figure 8:
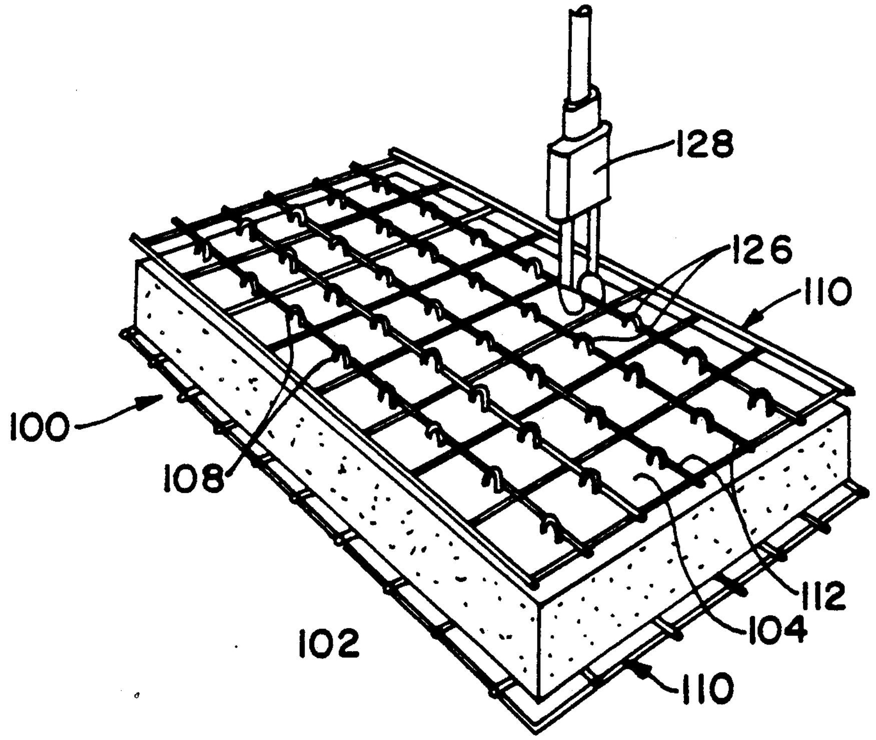
Figure 9:
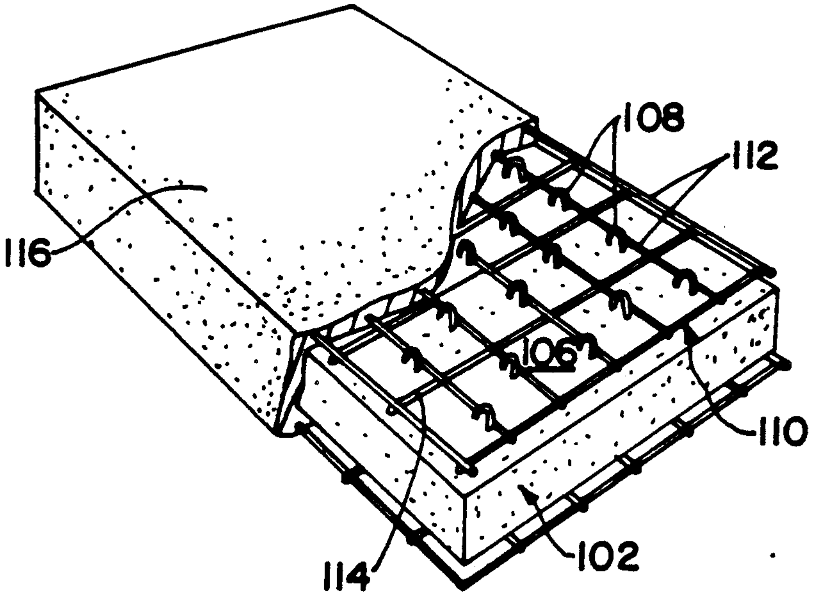
FIG. 9 is a perspective view, along with FIG. 1, of applying a cementitious layer to the thus fabricated reinforced structural panel as shown in FIG. 8.

Turning now to FIG. 7, a wire mesh grid 110 is positioned overlying the major surface 106 of the core 102. The longitudinal rods 112 of the wire mesh grid 110 are secured, such as by welding via welding equipment 128, to the projecting portions 126 of the serpentine or zig-zag shaped reinforcing rods 108. In welding the wire mesh grid 110 to the reinforcing rods 108, the centers of the rods 112, 114 of the grid are maintained spaced above the major surface 106 of the core 102 a distance of approximately one-half inch. In a similar process, a wire mesh grid 110 is welded to the projecting portions 126 of the reinforcing rods 108 which protrude outwardly from the major surface 104 of the core 102, as shown in FIG. 8. Once again referring to FIG. 2, the wire mesh grids 110 are maintained above the major surfaces 104, 106 of the core 102 and have spaced apart centers at a dimension of approximately three inches.

The structural panel 100, as thus far fabricated is movable to a construction site for assembly with like panels to form walls, ceilings and other load-bearing members for office buildings, residential homes and the like. The structural panel 100 can be completed insitu by applying a layer of cementitious material surrounding the insulating core 102 and wire mesh grids 110. By way of example, a layer 116 of cementitious material having a thickness of approximately one inch is applied over the two major surfaces 104, 106 of the core 102. As a result, the structural panel 100 has a finished thickness of approximately four inches. It is also to be understood that the layer 116 of cementitious material may be applied during fabrication of the structural panel 100 and the resulting completed panel shipped to the job site if so desired.

The completed structural panel 100 may be employed in various types of structures as walls by suitably positioning a number of the panels, holding them in desired configuration by means of temporarily wiring, welding or tying several panels to one another, and thereafter applying the layer 116 of the cementitious material such as a mixture of Portland cement and aggregates, concrete, gunnite, plaster or the like. The completed structural panel 100 is strong and rigid, but extremely lightweight and may be readily handled by one man, yet it provides the desirable qualities of strength, heat insulation, sound insulation and the ready adaptability to coating and securing to other structural panels and other such structures. The structural panel 100 may be readily made in other dimensions, if desired, or in other than planar configurations.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A method of making a reinforced structural member comprising providing a rigid panel of synthetic material having two opposing major surfaces, piercing both of said major surfaces to provide a plurality of slits extending through said panel, inserting serpentine shaped members into said slits, a portion of said members extending outwardly from each of said major surfaces, superimposing a grid on each of said major surfaces, and securing said portions of said members to said grid on each of said major surfaces.

2. The method of claim 1, wherein said panel comprises an integral, one-piece panel of thermal insulating material.

3. The method of claim 1, further including arranging said slits on said major surfaces in a matrix of rows and columns.

4. The method of claim 3, wherein said serpentine shaped members are inserted into said slits forming alternate rows on each of said major surfaces.

5. The method of claim 3, wherein said slits forming alternate rows on each of said major surfaces are longitudinally offset from each other.

6. The method of claim 1, wherein said piercing both of said major surfaces comprises inserting a knife assembly having a plurality of V-shaped blades through said panel along spaced apart rows, said blades extending through both of said major surfaces.

7. The method of claim 1, wherein said slits have a V-shaped profile, said slits having a first opening on one major surface of said panel and a second opening on another major surface of said panel, said first opening being substantially larger than said second opening.

8. The method of claim 1, wherein said grid is secured a space distance from each of said major surfaces.

9. The method of claim 1, further including applying a layer of cementitious material covering said grid on each of said major surfaces.

10. A method of making a reinforced structural member comprising providing an integral rigid panel of thermal insulating material having two opposing major surfaces, piercing each of said major surfaces to provide a plurality of slits having a V-shaped profile extending through said panel arranged in a matrix of rows and columns, said slits having a first opening on one major surface of said panel and a second opening on another major surface of said panel, said first opening being substantially larger than said second opening, said slits in adjacent rows longitudinally offset from one another, inserting serpentine shaped first members having V-shaped portions into said first openings of said slits forming alternate rows of said matrix on one of said major surfaces, a portion of said first members extending outwardly from each of said major surfaces, inserting serpentine shaped second members having V-shaped portions into said first openings of said slits forming alternate rows of said matrix on another of said major surfaces, a portion of said second members extending outwardly from each of said major surfaces, superimposing a grid on each of said major surfaces, and securing said portions of said first and second members to said grid on each of said major surfaces.

11. The method of claim 10, wherein said thermal insulating material comprises foam or cellular polyurethane or polystyrene.

12. The method of claim 10, wherein said piercing each of said major surfaces comprises inserting a knife assembly having a plurality of V-shaped blades into said panel along said rows, said blades extending through both of said major surfaces.

13. The method of claim 10, wherein said grid is secured a space distance from said major surfaces.

14. The method of claim 10, further including applying a layer of cementitious material covering said grid on each of said major surfaces.

15. The method of claim 10, wherein said grid comprises a plurality of longitudinal and transverse rods secured in a matrix.

16. The method of claim 15, wherein said portions of said first and second members are secured to said longitudinal rods of said grid.

17. A reinforced structural member comprising an integral rigid panel of synthetic material having two opposing major surfaces, a plurality of slits extending through said panel formed by piercing both of said major surfaces, a plurality of serpentine shaped members received within said slits, a portion of said members extending outwardly from each of said major surfaces, a grid superimposed on each of said major surfaces and said portions of said members secured to said grid on each of said major surfaces.

18. The structural member of claim 17, wherein said panel comprises a rigid one-piece panel of thermal insulating material.

19. The structural member of claim 18, wherein said thermal insulating material comprises foam or cellular polyurethane or polystyrene.

20. The structural member of claim 17, wherein said slits are arranged on said major surfaces in a matrix of rows and columns.

21. The structural member of claim 20, wherein said serpentine shaped members are inserted into said slits forming alternate rows on each of said major surfaces.

22. The structural member of claim 21, wherein said slits in alternate rows on each of said major surfaces are longitudinally offset from each other.

23. The structural member of V-shaped claim 17, wherein said slits are formed by piercing both of said major surfaces by inserting a knife assembly having a plurality of blades into said panel along spaced apart rows, said blades extending through both of said major surfaces.

24. The structural member of claim 17, wherein said slits have a V-shaped profile, said slits having a first opening on one major surface of said panel and a second opening on another major surface of said panel, said first opening being substantially larger than said second opening.

25. The structural member of claim 17, wherein said grid is secured a spaced distance from said major surfaces.

26. The structural member of claim 17, further including a layer of cementitions material covering said grid on each of said major surfaces.

27. The structural member of claim 26, wherrein said cementitions material comprises a mixture of portland cement and aggregates.

28. The structural member of claim 17, wherein said serpentine shaped members and said grid are formed from ungalvanized metal rods of number 10 gauge.

29. A reinforced structural member comprising an integral rigid panel of thermal insulating material having two opposing major surfaces, a plurality of slits having a V-shaped profile extending trough said panel arranged in a matrix of rows and columns formed by piercing each of said major surfaces, said slits having a first opening on one major surface of said panel and a second opening on another major surface of said panel, said first opening being substantially larger than said second opening, said slits in adjacent rows longitudinally a offset from one another, serpentine shaped first members having V-shaped portions received within said slits through said first openings forming alternate rows of said matrix on one of said major surfaces, a portion of said first members extending outwardly from each of said major surfaces, serpentine shaped second members having V-shaped portion received within said slits through said first openings forming alternate rows of said matrix on another of said major surfaces, a portion of said second members extending outwardly from each of said major surfaces, a grid superimposed on each of said major surfaces and said portions of said first and second members secured to said grid on each of said major surfaces.

30. The member of claim 29, wherein said thermal insulating material comprises foam or cellular polyurethane or polystyrene.

31. The members of claim 29, wherein said piercing each of said major surfaces comprises inserting a knife assembly having a plurlaity of V-shaped blades into said panel along said rows, said blades extending through both of said major surfaces.

32. The member of claim 29, wherein said grid is secured a space distance from said surfaces.

33. The member of claim 29, further including applying a layer of cementition material covering said grid on each of said major surfaces.

34. The member of claim 29, wherein said grid comprises a plurality of longitudinal and transverse rods secured in a matrix.

35. The member of claim 24, wherein said portions of said first and second members are secured to said longitudinal rods of said grid.

* * * * *

UNITED STATES PATENT AND TRADEMARK OFFICE
CERTIFICATE OF CORRECTION

PATENT NO. : 5,058,345

DATED : October 22, 1991

INVENTOR(S) : Manuel J. Martinez

It is certified that error appears in the above-identified patent and that said Letters Patent is hereby corrected as shown below:

Column 4, line 1, insert --with the-- after conjunction.
Column 4, line 59, "goods" should read --good--.
Column 7, line 46, "space" should read --spaced--.
Column 8, line 15, "space" should read --spaced--.
Column 8, line 36, delete "rigid".
Column 8, line 50, delete "V-shaped".
Column 8, line 53, insert --V-shaped-- after of.
Column 9, line 2, "portland" should read --Portland--.
Column 9, line 10, "trough" should read --through--.
Column 9, line 17, delete "a" before offset.
Column 10, line 9, "members" should read --member.--.
Column 9, line 23, "portion" should read --portions--.
Column 10, line 15, "space" should read --spaced--.
Column 10, line 15, insert --major-- before surfaces.
Column 10, line 17, "cementition" should read --cementitious--.
Column 10, line 22, "24" should read --34--.

Signed and Sealed this

Sixth Day of April, 1993

*Attest:*

STEPHEN G. KUNIN

*Attesting Officer*

*Acting Commissioner of Patents and Trademarks*